United States Patent [19]
Koyanagi et al.

[11] Patent Number: 5,754,238
[45] Date of Patent: May 19, 1998

[54] PICTURE SIGNAL DECODING METHOD AND APPARATUS THEREOF

[75] Inventors: Hideki Koyanagi, Kanagawa; Toru Wada, Saitama, both of Japan

[73] Assignee: Sony Corporation, Tokyo, Japan

[21] Appl. No.: 621,980

[22] Filed: Mar. 26, 1996

[30] Foreign Application Priority Data

Mar. 27, 1995 [JP] Japan .................. 7-093050

[51] Int. Cl.⁶ .................. H04N 7/12; H04N 11/02; H04N 11/04; H04N 5/44
[52] U.S. Cl. .................. 348/415; 348/412; 348/561; 348/581; 348/438
[58] Field of Search .................. 348/409, 412, 348/423, 416, 415, 420, 438, 461, 561, 562, 581, 582; H04N 7/12, 11/02, 11/04

[56] References Cited

U.S. PATENT DOCUMENTS

| | | | |
|---|---|---|---|
| 5,068,731 | 11/1991 | Takeuchi | 358/180 |
| 5,107,334 | 4/1992 | Matsumoto | 358/180 |
| 5,377,051 | 12/1994 | Lane et al. | 360/33.1 |
| 5,539,466 | 7/1996 | Igarashi | 348/401 |
| 5,543,932 | 8/1996 | Chang et al. | 358/335 |
| 5,552,834 | 9/1996 | Matsushima | 348/581 |
| 5,574,504 | 11/1996 | Yagasaki et al. | 348/412 |

OTHER PUBLICATIONS

SGS–Thomson Microelectronics STi3240, MPEG/H.261 Video Decoder; pp. 1–51 and section 7.2. Jul. 1992.

*Primary Examiner*—Tommy P. Chin
*Assistant Examiner*—Nhon T. Diep
*Attorney, Agent, or Firm*—Frommer Lawrence & Haug LLP; William S. Frommer

[57] ABSTRACT

In a picture signal decoding method, preceding of the display operation to the decoding operation can be prevented as to a bidirectional predictive picture. When the user specifies an arbitrary magnification display mode in which a part of a decoded picture is magnified to an arbitrary size and displayed on a display screen, the decoding operation of an input picture signal which corresponds to a bidirectional predictive picture in input picture signals is started from a signal portion corresponding to the input display start position. Thereby, a picture signal decoding apparatus in which decoding operation can always be finished before display operation starts, can be accomplished with a simple construction.

17 Claims, 10 Drawing Sheets

1

PICTURE SIGNAL DECODING METHOD AND APPARATUS THEREOF

BACKGROUND OF THE INVENTION

1. Field of the Invention

This invention relates to a picture signal decoding method and an apparatus thereof, and is suitable to apply to, for example, a recording and reproducing apparatus for recording and reproducing a motion picture signal to or from a recording medium such as a magneto-optical disc, a magnetic tape or the like, and a receiver of video conference system in which a motion picture signal is transmitted and received via a transmission line.

2. Description of the Related Art

Heretofore, in a system for transmitting a motion picture signal to a remote place such as a video conference system, a video telephone system, a broadcasting system or the like, it has been used that a method for compressing and coding a picture signal by means of line correlation or intra-frame correlation of a video signal so that a transmission line is efficiently used. For instance, in the use of line correlation, compression of a picture signal can be implemented by an orthogonal transform (e.g., a discrete cosine transform (DCT)) coding, while in the use of intra-frame correlation, higher compression of a picture signal can be accomplished.

It is typically little difference between the pictures of temporarily adjacent frames, thus when calculating that, it is a small value. In that reason, this difference signal is used in coding for reduction of coding quantity. But in the case where only difference signal is transmitted, an original picture cannot be restored. Therefore, it is applied that a method for compressing and coding a picture signal by transforming the picture of each frame to any one of three kinds of frame formats, I-, P- and B-PICTURE.

FIGS. 1A and 1B show this coding method. In the compression coding method, a series of frame groups are processed in a unit of 17 frames (frames F1 to F17) which is referred to as "group of pictures". The group of pictures is sequentially coded to I-, B- or P-PICTURE from the head frame F1, and then the frames F4 to F17 are alternately coded to B- and P-PICTURE.

I-PICTURE is obtained by coding a picture signal for one frame as it is. P-PICTURE is obtained basically by coding the difference of picture signals between a P-PICTURE and an I-PICTURE in which the I-PICTURE is temporarily preceding to the P-PICTURE or the difference of picture signals between a P-PICTURE and the next P-PICTURE temporarily preceding to, as shown in FIG. 1A. B-PICTURE is obtained basically by coding the differences between picture signal of frames to mean value, as shown in FIG. 1B. This coding system is referred to as "bidirectional predictive coding".

Practically, to obtain B-PICTURE, three kinds of coding methods as the following are used in addition to the bidirectional predictive coding: (1) intra-coding wherein data of the original frame F2 is transmitted as transmission data as it is in similar with the I-PICTURE; (2) backward predictive coding wherein the difference between the frame F2 and the following frame F3 is calculated and transmitted; (3) forward predictive coding wherein the difference between the frame F2 and the preceding frame F1 is calculated and transmitted.

In coding, the data which has been coded by one of four coding methods of the above with the least transmission data, is used as B-PICTURE.

2

In actual coding apparatuses, a picture signal which has been transformed to frame format (I-, P- or B-PICTURE) is further transformed to a signal in block format, and then it is transmitted to a decoding apparatus via a transmission line.

This block format will be described with accompanying FIGS. 2A to 2C. A picture signal of frame format is formed by V lines each having H dots.

A picture signal for one frame is distributed into N slices which have an arbitrary length for 16 lines. Each slice is composed of M macro blocks. Each macro block is composed of a luminance signal corresponding to 16×16 pixels (dots) which is distributed into blocks Y|1|–Y|4| in a unit of 8×8 dots. The 16×16 dots luminance signal is corresponding to 8×8 dots color signals Cb and Cr.

Code d bit stream in the above manner is fetched to a decoding apparatus via a transmission line or the like, and decoded by the processing that is in the inverse order to the coding by the coding apparatus. Thus decoded frame picture is temporarily fetched to a frame memory group every frame format to be used in decoding in the future.

Recently, it is often used that a decoding apparatus in which down sizing of the system is accomplished by using such frame memory group and a display frame memory in common. As an example of that, there is the MPEG VIDEO DECODER STi3240 made by TOMSON corporation.

FIG. 3 shows the using schedule of the frame memory group in the STi3240. Here the axis of ordinates represents four frame memories A, B, C and D forming the frame memory group and the axis of abscissas represents time. Broken lines dividing the axis of abscissas into equal sections represents the time per frame. Arrows shown by full line represent writing operation of a picture and arrows shown by broken line represent reading operation for display of a picture.

It will be explained first about a using example of the frame memories in writing of present decoded picture. The use of the frame memory is different according to a frame format of a picture to be decoded. For instance, in case of P-PICTURE, a forward predictive picture which is necessary for decoding P-PICTURE is stored in to one of four frame memories A, B, C and D, therefore one of three frame memories other than that is used to write and read the present decoded picture.

In case of B-PICTURE, a forward and a backward predictive pictures which are necessary for decoding of B-PICTURE are stored in to two of the four frame memories, therefore the remaining two frame memories are used write and read the present decoded picture. This state will be described in further detail with the realistic example shown in FIG. 3. In FIG. 3, the picture is displayed in order of B B I B B P B B P . . . .

First, at the time t1 to decode an I-PICTURE, the decoding apparatus sequentially writes decoded picture data into one of the frame memories A, B, C and D, here it was written into the frame memory A because I-PICTURES are coded without using the preceding and the following frame pictures.

At the time t2 and t3 to decode a B-PICTURE, the decoding apparatus sequentially writes decoded picture data into a new frame memory C in order to obtain a backward and a forward predictive pictures from the pictures stored into the frame memories A and B. In FIG. 3, the B-PICTURE is decoded only from the I-PICTURE.

Then at the time t4 to decode a P-PICTURE, the decoding apparatus sequentially writes decoded picture data into the frame memory B in order to obtain a forward predictive picture from the picture of the frame memory A.

On the other hand, reading for display of a picture is implemented as following. In case of FIG. 3, the arrow shown by a broken line begins from the intermediate of each time, but it shows that displaying operation of a picture delays for one frame.

By the way, also the displaying operation of a picture is different according to the frame format of a picture to be displayed. For instance, in case of a P-PICTURE, the displaying operation is executed after the use of a P-PICTURE as a predictive picture is finished, because the P-PICTURE is also used in the decoding of the other frame pictures after written into a frame memory. On the contrary, a B-PICTURE is read out and displayed as soon as completed the decoding operation because the B-PICTURE is not used in the decoding of the other frame pictures.

As the aforesaid instance, when the displaying is started one frame later (time necessary for displaying picture data of one frame) than the decoding operation, as shown in FIG. 3, at the time t3 (the B-PICTURE of the second frame), the displaying operation shown by a rough broken line crosses the storing operation of the decoded picture into the memory which is shown by a fine broken line. To avoid this, the frame memory D for storing has been prepared.

However, since the apparatus as the STi3240, in which the displaying is delayed for one frame time requires four frame memories, the hardware becomes larger and it takes large cost.

SUMMARY OF THE INVENTION

In view of the foregoing, an object of this invention is to provide a method and apparatus for picture signal decoding which uses less frame memories than conventional one, and in which delaying or preceding of the decoding operation of a display picture can be prevented, even in the case where the number of frame memories are reduced, and in the case where an specified area on the screen is displayed with magnification.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) Operational principle In the STi3240, the displaying of a picture is started one frame time later from the decoding. Therefore, four frame memories are required as described the above.

However, if the displaying is started one field time later from the decoding, the frame memory of B-PICTURE can be used in displaying and storing in common, and reducing one frame memory.

The displaying operation will be described concretely in this case.

Figure 1A:
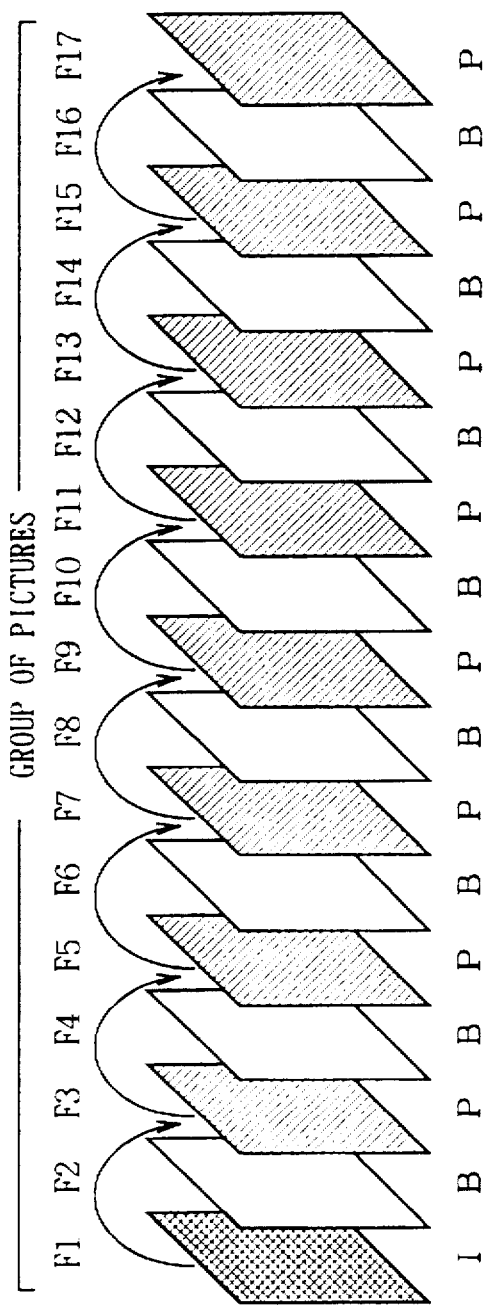
FIGS. 1A and 1B are schematic diagrams showing a picture type of an input picture signal.
Figure 1B:
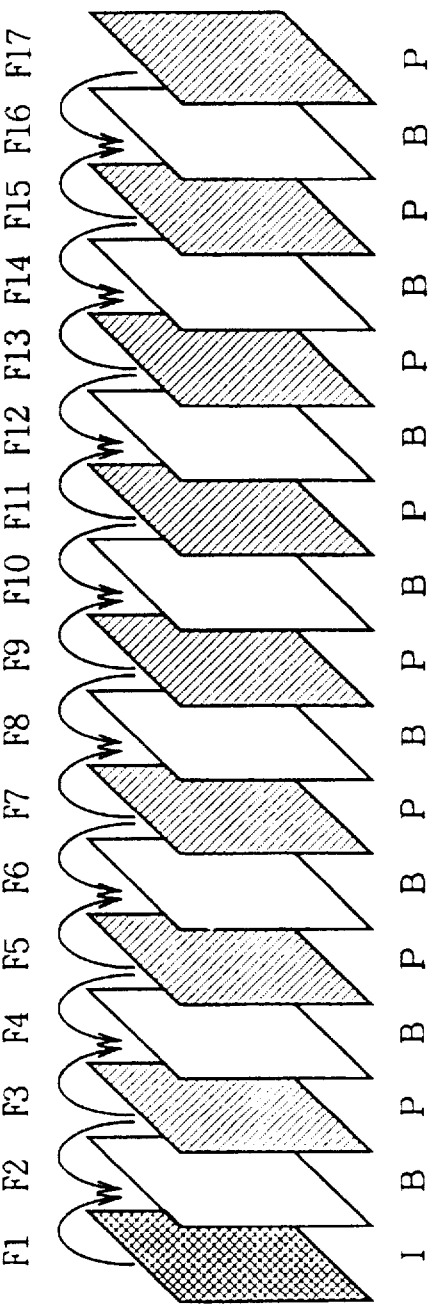
Figure 2:
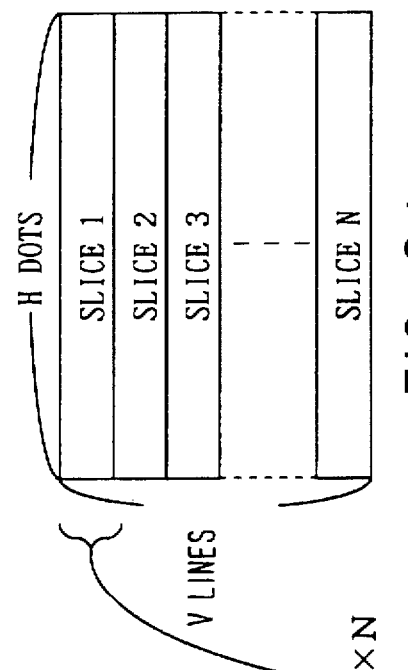
FIGS. 2A to 2C are schematic diagrams showing the data structure of picture data.
Figure 2:
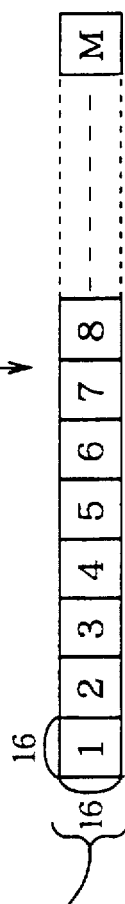
Figure 2:
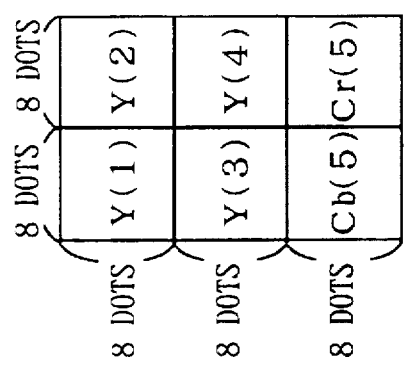
Figure 3:
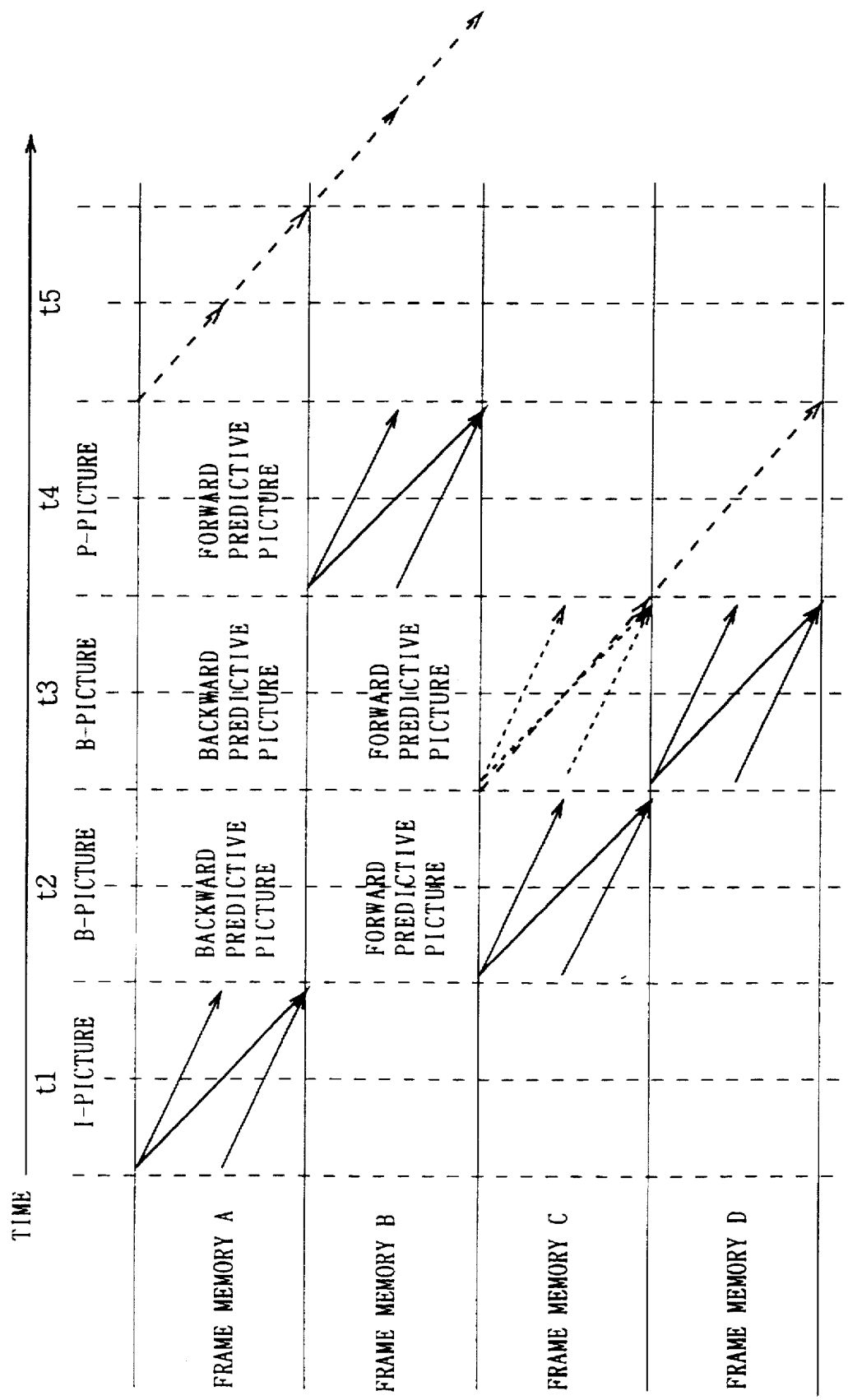
FIG. 3 is a schematic diagram showing the relation between the decoding operation and the displaying operation in a normal display mode in case of displaying with delaying for one frame time.
Figure 4:
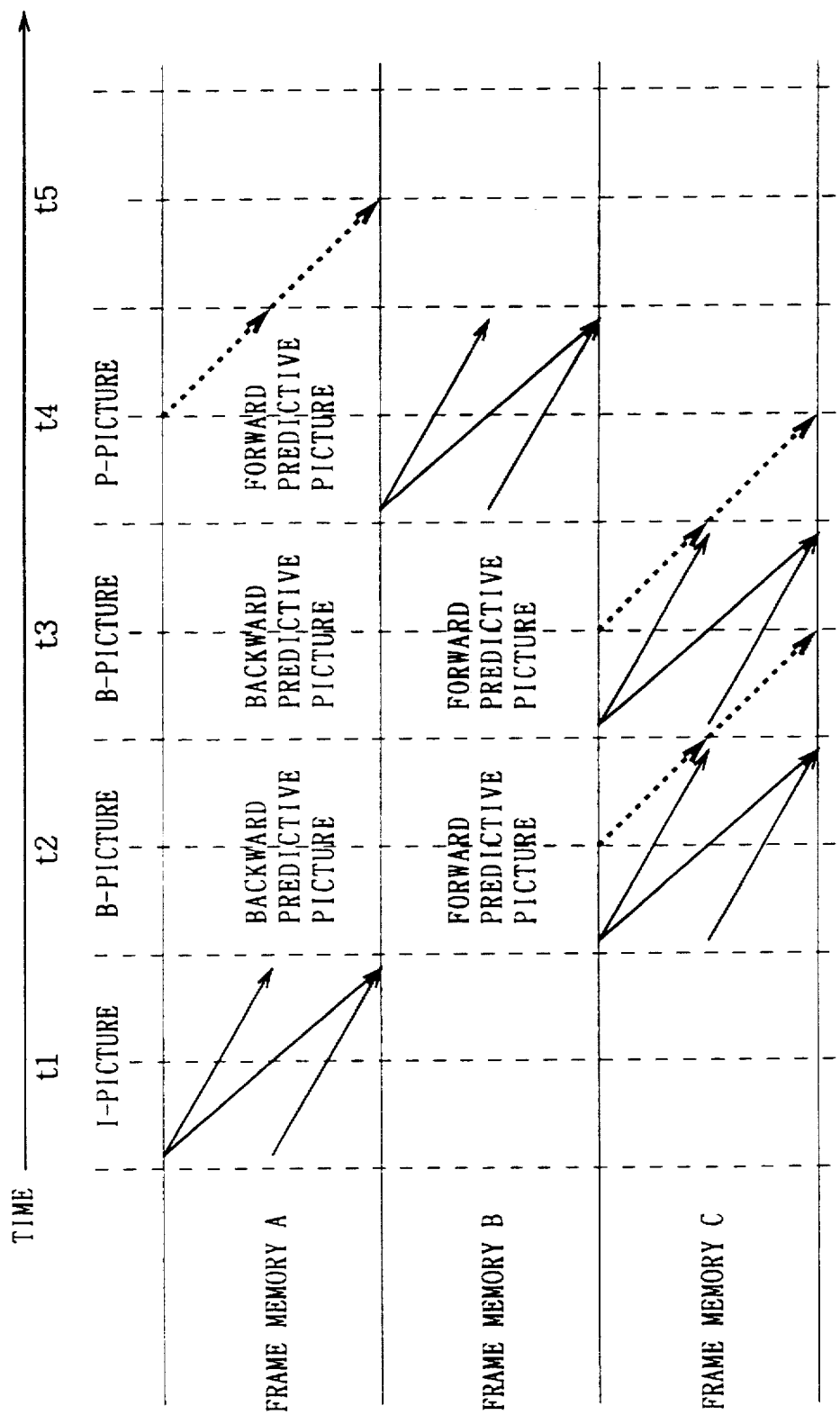
FIG. 4 is a schematic diagram showing the relation between decoding operation and the displaying operation in a normal display mode in case of displaying with delaying for one field time.

In FIG. 4, arrows shown by a broken line beginning from the intermediate of each time means that displaying operation of a picture is delaying for ½ frame, i.e., one field, from decoding operation.

By the way, also the displaying operation of a picture is different according to the frame format of a picture to be displayed. For instance, in case of a P-PICTURE, the displaying is executed after the use of P-PICTURE as a predictive picture is finished, because the P-PICTURE is also used in the decoding of the other frame pictures after written into a frame memory. On the contrary, a B-PICTURE is read out and displayed as soon as the decoding is finished because the B-PICTURE is not used in the decoding of the other frame pictures.

Figure 5A:
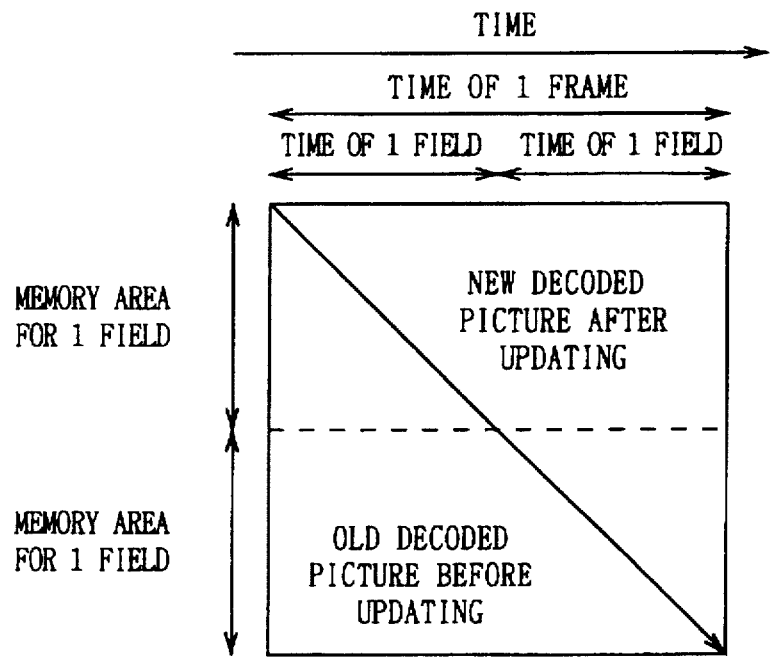
FIGS. 5A to 5C are schematic diagrams showing an example of display of decoding operation.

It will be described about this decoding accompanying with FIGS. 5A to 5C. FIG. 5A shows the decoding operation of a picture having field structure and the writing operation into each frame memory.

In case of a picture having field structure, the decoding operation of the second field is executed after the decoding operation of the first field is completed. The oblique arrow represents this operation.

In Figure, the lower part of the arrow shows an old decoded picture on the frame memory before updating and the upper part of the arrow shows a new decoded picture on the frame memory after updating.

In view of this Figure, it is found that the state where the recording contents is updated to new recording contents with time passes.

Figure 5B:
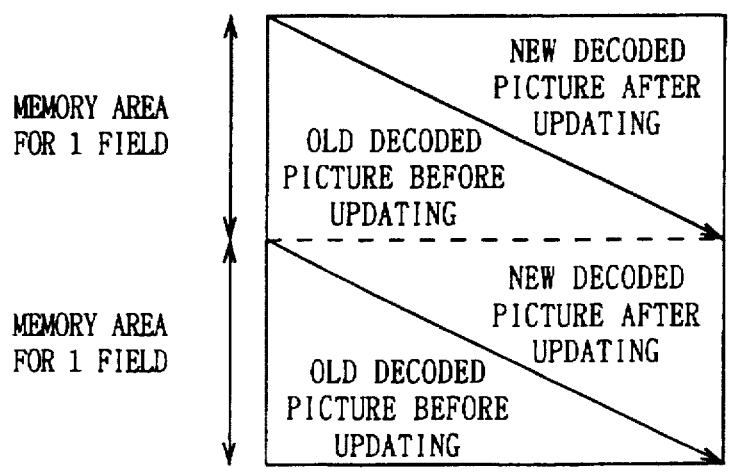
Figure 5C:
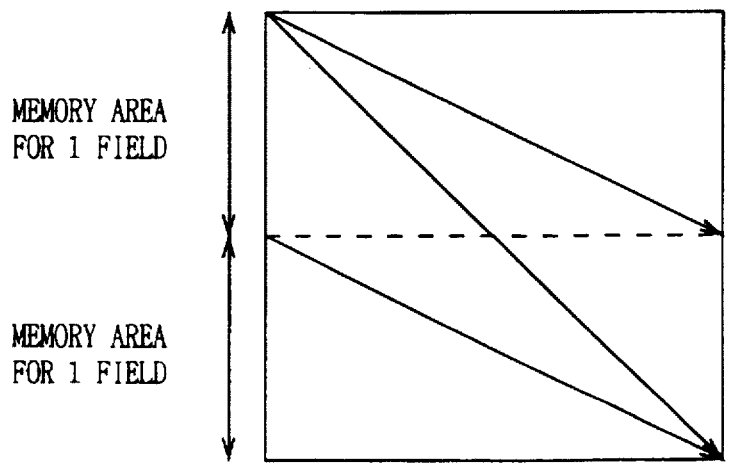

FIG. 5B shows the writing operation where a picture having frame structure is decoded and written to the frame memory.

In case of the picture having frame structure, the first field and the second field are decoded alternatively line by line. Accordingly, the decoding operation of the pictures of the first and the second fields are executed simultaneously.

That is, the decoded picture is simultaneously written to both of the first and the second memory areas in the frame memory.

As the above, the writing operation of a picture to the frame memory is different according to whether the picture structure is the field structure or the frame structure. FIGS. 4 and 5C show that in a pile for the sake of convenience. The picture structure has been described in detail in U.S. Ser. No. 08/312.434.

Now in view of the relation between the decoding operation and the displaying operation of a picture to the frame memory from this Figure, when the decoding operation (that is, the writing operation) to the frame memory precedes the displaying operation, a newer picture than the picture ever displayed is displayed on the screen.

On the contrary, when the displaying operation precedes the storing operation to the frame memory, an older picture than the picture has been displayed is displayed as soon as precede.

That is, the storing operation to the frame memory should not precede the displaying operation, and also the displaying operation should not precede the storing operation. This means that the arrow shown by a full line and the arrow shown by a broken line should not be crossed to each other.

Generally, the decoded picture written into the frame memory and the display picture on the display screen are the same each other, thus there is no failure in the relation between the decoding operation and the displaying operation.

Figure 6:
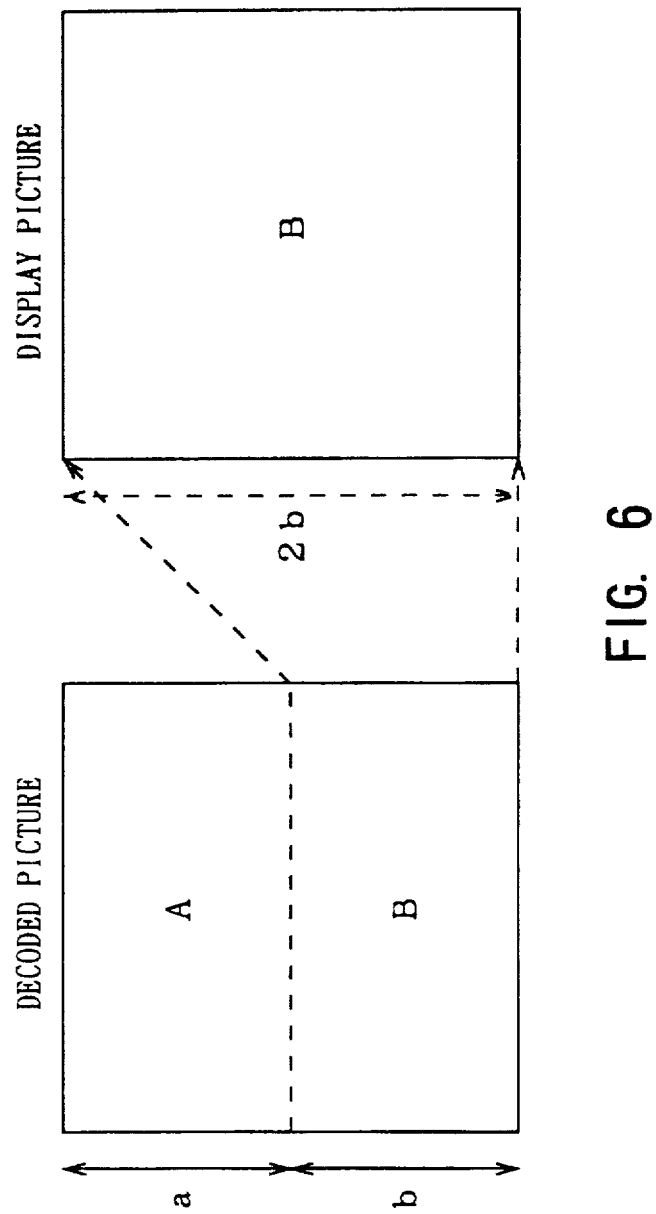
FIG. 6 is a schematic diagram showing an example of display in an arbitrary magnification display mode.

However, as shown in FIG. 6, if the user instructs the use of displaying with magnification of the lower half of the decoded picture displayed on the screen (it is often used in computers), it is afraid the relation between the decoding operation and the displaying operation is not satisfied.

Figure 7:
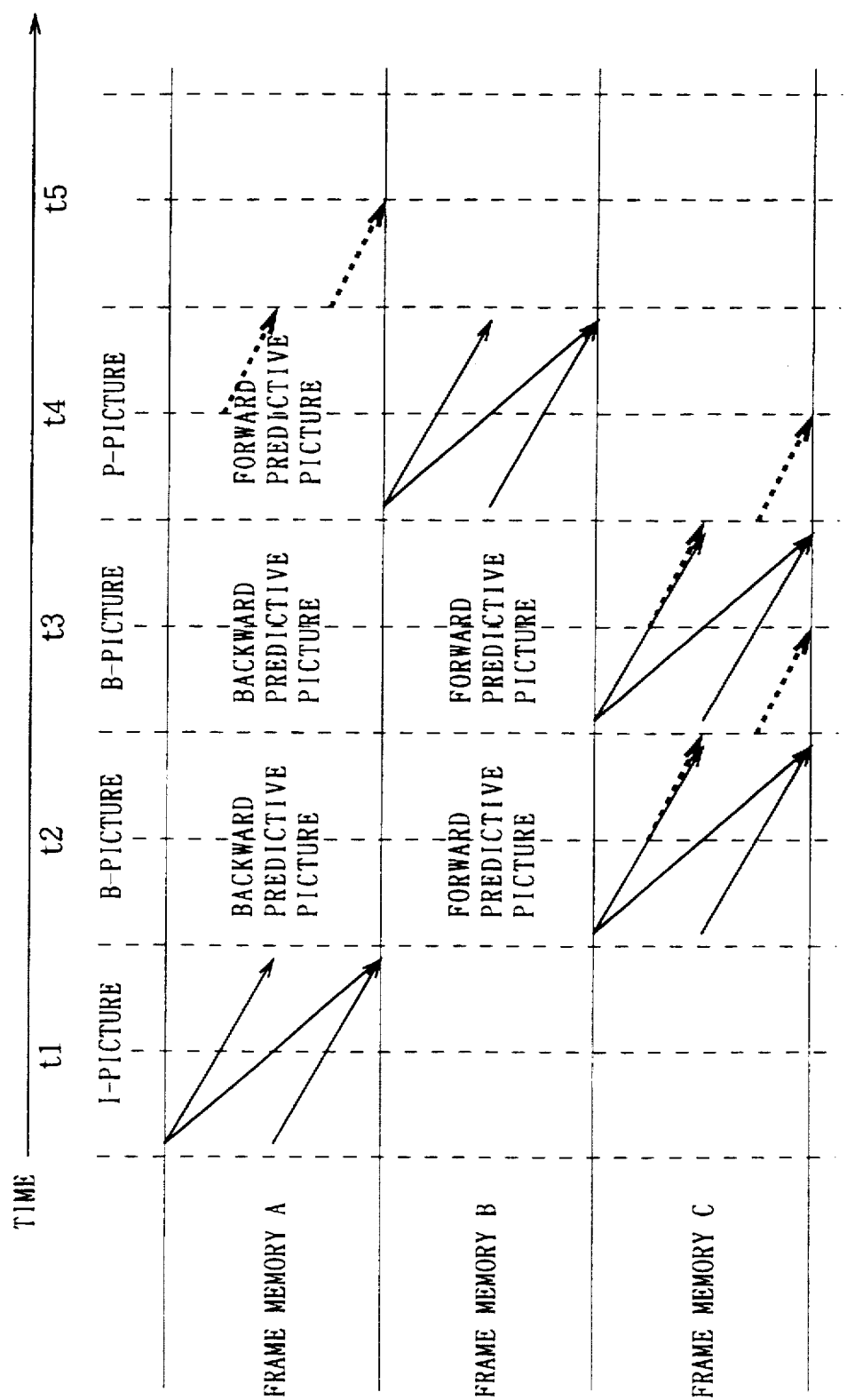
FIG. 7 is a schematic diagram showing the relation between the decoding operation and the displaying operation in an arbitrary magnification display mode in case of displaying with delaying for one field time.

This state will be described using FIG. 7. In the picture of the second field which forms the B-PICTURE of the time t2 and t3, as shown in Figure, the arrow of a full line and the arrow of a broken line are close to each other, and the relation between the decoding operation and the displaying operation is delicate. In this connection, the arrow of a broken line is beginning from the intermediate of the frame memory area in this Figure, however, this aims to read out the lower half of the first and the second fields respectively.

This invention is provided further considering the above points.

(2) Structure of Picture Signal Decoding Apparatus
(2-1) General Configuration

Figure 8:
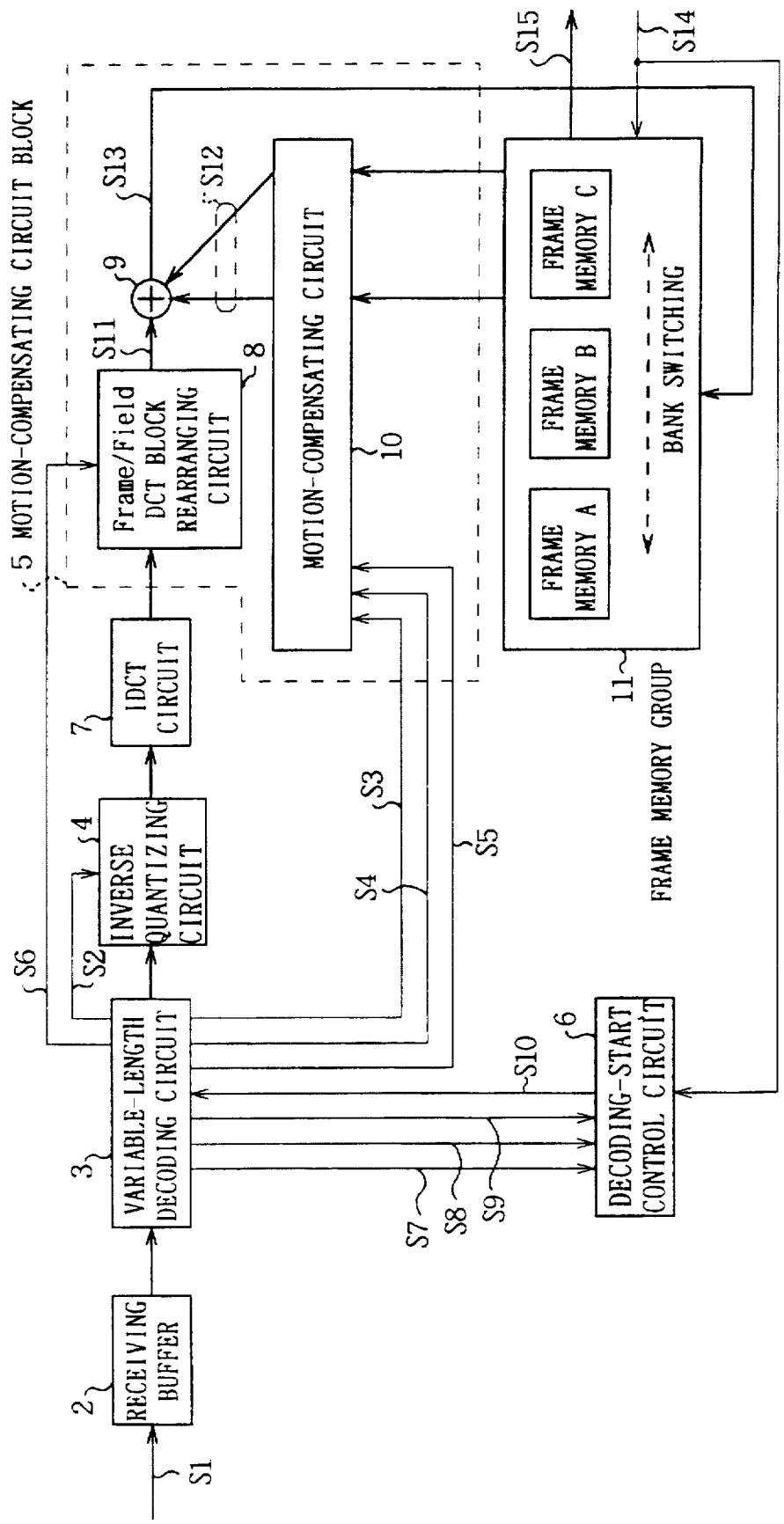
FIG. 8 is a block diagram showing an embodiment of the picture signal decoding apparatus according to the this invention.

FIG. 8 shows the general configuration of a picture signal decoding apparatus 1. The picture signal decoding apparatus 1 controls a decoding start position when displaying with magnification as to a part of area of B-PICTURE is instructed, so as to prevent preceding of the displaying to the decoding.

Each block is structured as the following.

A bit stream S1 which has been input via a recording medium or a transmission line is temporarily stored first to a receiving buffer 2.

The bit stream S1 from the receiving buffer 2 is input to a variable-length decoding circuit 3 and variable-length decoded. At the variable-length decoding circuit 3 picture data obtained by decoding is distributed to an inverse quantizing circuit 4, and various flag information S2 to S6 which will be used in the following processing are output to the inverse quantizing circuit 4 and a motion-compensating circuit block 5.

Here the flag information S2 to S6 are a quantization step S2, a motion vector S3, a predictive mode (macro block coding type) S4, a frame/field predictive flag S5 (hereinafter, referred to as a predictive flag S5), and a frame/field DCT flag S6 (hereinafter, referred to as a DCT flag S6), respectively.

Various signals S7 to S10 are sent and received between the variable-length decoding circuit 3 and a decoding-start control circuit 6 so that a decoding start position is controlled based on those signals.

Note that, the control signals S7 to S10 a re a picture structure information signal S7, a picture type information signal S8, a slice address information signal S9, and a decoding start information signal S10, respectively.

The picture structure information signal S7 is a signal showing that the picture is whether a frame structure or a field structure, and the picture type information signal S8 is a signal showing that the picture is it, an I-PICTURE, a P-PICTURE or a B-PICTURE. And the slice address information signal S9 is a signal showing a macro block position of a decoding picture which will be decoded in future in the vertical direction.

The decoded picture data is input from the variable-length decoding circuit 3 to an inverse-quantizing circuit 4 and inversely quantized according to the quantization scale S2.

The data (DCT coefficient) input from the inverse-quantizing circuit 4 is IDCT-processed and thus processing result is distributed to the motion-compensating circuit block 5.

The processing result is input to a frame/field DCT block rearranging circuit 8.

At the frame/field DCT block rearranging circuit 8 the data input from the IDCT circuit 7 is rearranged in accordance with the instruction of the DCT flag S6 and the picture data S2 is output to an execution unit 9.

At the execution unit 9, the picture data S11 obtained by the above processing is added to predictive picture data S12 which is input from the motion-compensating circuit 10, and the operation result is output as a reproducing picture signal S13.

At the motion-compensating circuit 10 the picture data read out from a frame memory group 11 is motion-compensated on the basis of the motion vector S3, thus a predictive picture data S12 is generated. By the way, if a picture type of the picture data S11 is an I-PICTURE, the predictive picture data S12 is not added to the picture data S11, because in case of I-PICTURE, the picture data S11 is the reproducing picture signal.

If a picture type of the picture data S11 is a P-PICTURE and the picture data S11 is data coded in a forward predictive mode, at the motion compensating circuit 10 a forward predictive picture is read out from the frame memory group 11 and motion-compensated based on the motion vector S3 thus the predictive picture data S12 is generated. In this connection, if the picture data S11 is macro block data coded in an inter-frame predictive mode even if that is picture data of a P-PICTURE, the predictive picture data S12 is not added to in similar with the picture data of an I-PICTURE.

If a picture type of the picture data S11 is a B-PICTURE and coded in a forward predictive mode, at the motion compensating circuit 10 a forward predictive picture is read out from the frame memory group 11 and motion-compensated based on the motion vector S3 thus predictive picture data S12 is generated.

If a picture type of the picture data S11 is a B-PICTURE and coded in a backward predictive mode, at the motion-compensating circuit 10 a backward predictive picture is read out and motion-compensated based on the motion vector S3 thus predictive picture data S12 is generated.

If a picture type of the picture data S11 is a B-PICTURE and the picture data S11 is coded in a bidirectional predictive mode, at the motion compensating circuit 10 a forward predictive picture and a backward predictive picture are read out respectively and motion-compensated based on the motion vector S3 thus predictive picture data S12 is generated.

In the motion compensating circuit 10, it is performed that processing for a predictive mode switching circuit and a DCT mode switching circuit which have been provided at the coding device side, more specifically, processing in which an arrangement such that a signal in an odd number field line is separated from a signal in an even number field line, is restored to an original arrangement such that those signals are mixed, as occasion demand.

At the frame memory group 11 the reproducing picture signal S13 output from the execution unit 9 is stored as an output of the picture data to the motion compensating circuit 10 and an output to a display device.

This frame memory group 11 is composed of three memories of frame memories A, B and C, and stores the reproducing picture signal S13 into one of three frame memories A to C according to a picture type of the present decoded picture data.

Further at the frame memory group 11 a picture area read out from the frame memory is controlled on the basis of display picture information S14 showing a magnifying and displaying part in a frame, and this is output to a display device as an output display picture signal S15.

It has been described about the processing of a luminance signal in the above, however, the processing of a color difference signal is similar with that. However, in this case, it is used as a motion vector that is ½ times the motion vector for luminance signal in the vertical and the horizontal directions.

(2-2) Structure of decoding-start control circuit

Figure 9:
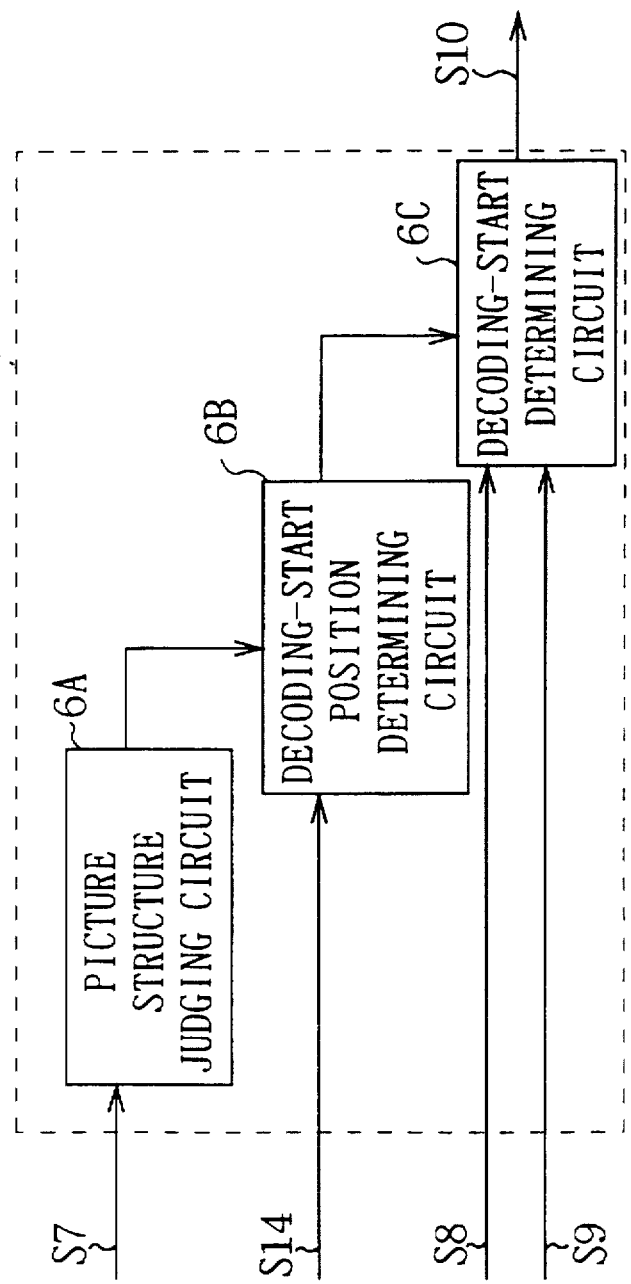
FIG. 9 is a block diagram showing an internal circuit of a decoding-start control circuit.

FIG. 9 shows the internal structure of a decoding-start control circuit 6. The decoding-start control circuit 6 is composed of a picture structure judging circuit 6A, a decoding-start position determining circuit 6B and a decoding-start determining circuit 6C.

The picture structure judging circuit 6A judges that a picture to be decoded now was coded to whether a frame structure or a field structure, according to the picture structure information signal S7. The judged result is output from the picture structure judging circuit 6A to the decoding-start position determining circuit 6B.

The decoding-start position determining circuit 6B receives the judged result of the picture structure judging circuit 6A and determines a decoding start position corresponding to the display picture information S14 based on the picture structure. In this connection, in the variable-length decoding circuit 3, decoding is implemented in a macro block unit, therefore when a decoding-start position specified by the display picture information S14 is not the head of a macro block, determining-start position determining circuit 6B determines a position of a macro block which has a lower phase than the macro block as the decoding-start position, by calculation.

This decoding-start position determining circuit 6B switches transforming operation according to the method of specifying a displaying position by the display picture information S14. In this embodiment, it will be described that a method of specifying a display position by the number of lines from the first line in a field of a display picture, and a method of specifying a display position by the number of lines from the first line in a frame of a display picture.

It will be described first about the case of specifying by the display picture information S14 by the number of lines from the first line in a field of a display picture.

In this case, the decoding-start position determining circuit 6B calculates a decoding start position according to that a decoded picture has whether a field structure or a frame structure, as the following.

In a decoded picture having a field structure, a macro block is formed by one field, i.e., 16 lines, therefore the decoding-start position determining circuit 6B obtains the value that the display picture information S14 is multiplied by ¹⁄₁₆ as a decoding start position. However, because a decoding-start position should be an integral number, a value that the display picture is multiplied by ¹⁄₁₆, the figures below the decimals is omitted, and 1 is added thereto, the decoding-start position determining circuit 6B obtains and supplies to the decoding-start determining circuit 6C. In this connection, 1 is added because in a slice address information used in decoding, the spatially upper most address is handled as 1. Note that, the calculation adding 1 may be executed by the decoding-start determining circuit 6C.

In a decoded picture having a frame structure, each frame is formed in that a picture of the first field and a picture of the second field are arranged alternatively for one line. Accordingly, two lines of the decoded picture spatially corresponds to one line of the display picture information S14. Thus the decoding-start position determining circuit 6B multiplies ⅛ by the display picture information S14 and omits the figure below the decimals and adds 1, and supplies thus obtained value to the decoding-start determining circuit 6C as a decoding start position.

On the contrary, in the case where the display picture information S14 is given from the first line of a frame of a display picture with the number of lines, a decoding start position is determined as follows.

Also in this case, the decoding-start position determining circuit 6B calculates a decoding start position according to that the decoded picture has whether a field structure or a frame structure as follows.

If a decoded picture has a field structure, the decoding-start position determining circuit 6B is structured such that, a macro block is formed in 16 lines on a field, and in each frame the picture of the first field and the picture of the second field are arranged alternatively for one line, therefore the decoding-start position determining circuit 6B obtains a value that the display picture information S14 is multiplied by ¹⁄₃₂, the figures below the decimals is omitted, and 1 is added thereto as a decoding start position.

If a decoded picture has a frame structure, because a macro block is formed in one field, 16 lines, the decoding-start position determining circuit 6B obtains a value that the display picture information S15 is multiplied by ¹⁄₁₆, the figures below the decimals is omitted, and 1 is added thereto, and supplies the value to the decoding-start determining circuit 6C as a decoding start position.

In this connection, in the case where the slice address information of a picture to be decoded now is given as the display picture information S14, the abovementioned calculation is not required in the decoding-start position determining circuit 6B.

Last it will be described about the decoding-start determining circuit 6C. The decoding start determining circuit 6C compares the calculated decoding start position with the slice address information S9 based on the picture type information S8 only in the case where the decoded picture is a B-PICTURE.

This is the reason why a B-PICTURE has a possibility being not satisfied the condition that the displaying should not precede the decoding, because the relation between the decoding time and the displaying time becomes delicate, or in an I-PICTURE and a P-PICTURE it is required to be decoded in the entire screen because they are used as predictive pictures.

If the decoding-start determining circuit 6C judges that the slice address information S9 is smaller than the decoding start position (This means that data to be decoded now is at a spatially upper position than the displaying start position, that is, it will not be displayed.), the decoding-start determining circuit 6C instructs no decoding by the decoding start information S10.

On the contrary, if the decoding-start determining circuit 6C judges that the slice address information S9 is equal to the decoding start position or larger than the decoding start position (This means that data to be decoded now is at a spatially lower position than the displaying start position, that is, it will be displayed.), the decoding-start determining circuit 6C instructs decoding by the decoding start information S10.

(3) Processing operation

Figure 10:
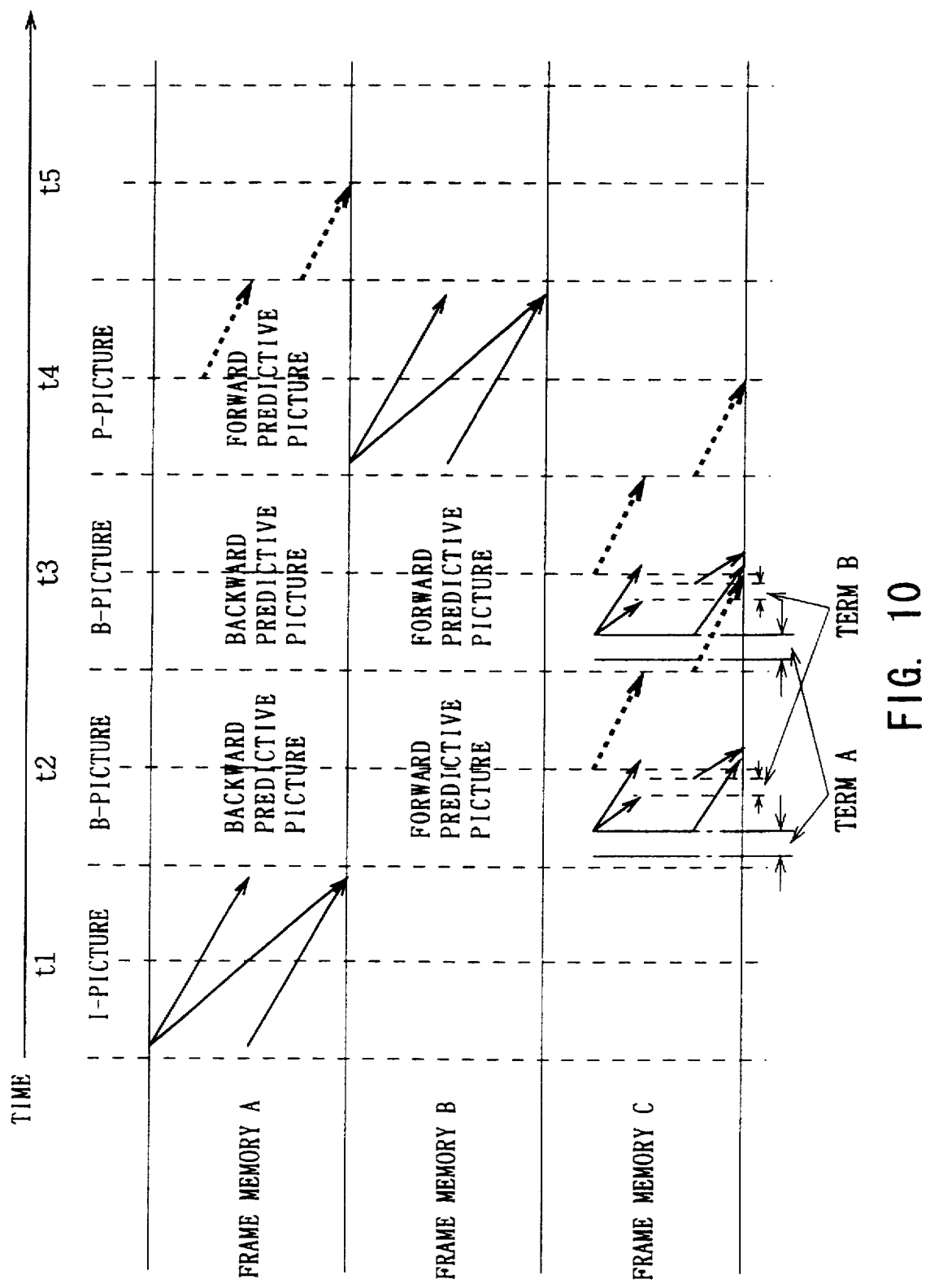
FIG. 10 is a schematic diagram showing the temporal and spatial positional relation between the decoding operation and the displaying operation in the embodiment.

FIG. 10 shows an example of decoding of the picture signal decoding apparatus 1 having the above structure in the case where the lower half portion of the screen is magnified and displayed on the entire screen.

In the picture signal decoding apparatus 1, at the time t1, the header information of the bit stream S1 is decoded at the variable-length decoding circuit 3 and discriminated a picture type of the bit stream S1 to be input now. If a picture type is discriminated as an I-PICTURE by the variable-length decoding circuit 3 at the time t1, this discrimination result is distributed to the decoding-start control circuit 6 as the picture type information S8.

At the decoding-start control circuit 6, a decoding starting position by the variable-length decoding circuit 3 is determined from the discrimination result. In case of this time t1, the decoding start information S10 is output from the decoding-start control circuit 6 so that the variable-length decoding circuit 3 starts decoding from the header position of a picture (at the spatially leftmost and uppermost on the screen).

The output signal from the variable-length decoding circuit 3 is distributed to the execution unit 9 through various processing circuits and is output and stored to the frame memory group 11 as the reproducing picture signal S13.

At this time, the data of the whole screen of the I-PICTURE is written to the frame memory group 11. However, in the frame memory group 11, data corresponding to the lower half of the screen is output according to the instruction of the display picture information S14 at the time t4 and t5.

At the following time t2 and t3, in the decoding-start control circuit 6, if it is determined that the picture type of a picture to be decoded now is a B-PICTURE according to the picture type information S8, a decoding start position corresponding to the position specified by the display picture information S14 is calculated and compared with the slice address information S9 of the bit stream S1.

If the slice address information S9 is smaller than the decoding start position, the decoding-start control circuit 6 instructs skipping of bit-reading until those values coincide with each other. In FIG. 10, the term A shows a term skipping the bit stream reading of the first field when the decoded picture has a frame structure or a field structure. And the term B shows a term skipping the bit stream reading of the second field when the decoded picture has a field structure.

In this state, the beginning of the arrow shown by a full line shown in FIG. 10 is at the intermediate of the frame memory not at the head. Besides, the beginning of the arrow shown by a full line in FIG. 10 delays from the beginning of each frame for the time until the decoding start position is found, however, the time necessary for the skipping is short comparing with the time necessary for decoding.

This is resulted from that the decoding according to the decoding start information S10 by the variable-length decoding circuit 3, or the skipping of the bit stream S1 without decoding, are performed in a unit of the slice address information S9.

More specifically, that is resulted from the slice address information S9 is used as a synchronization signal in the bit stream S1, and the variable-length decoding circuit 3 provides a function to high-speed search the synchronization signal.

The skipping can be shortened in comparison with the decoding by the use of this function.

Thereby, writing to the frame memory group 11 can be completed before reading for display starts. As a result, it can be omitted a term that a full line showing the decoding is remarkably close to a broken line showing the displaying to each other, as shown in FIG. 10.

According to the above structure, in the case where such instruction that magnifies and displays the lower half of a decoded picture to the entire screen is instructed by the user, etc., as to a B-PICTURE in which the time relation between decoding and displaying is delicate, decoding of the bit stream S1 is skipped to the portion of an area instructed displaying start. Thus a picture signal decoding apparatus in which displaying has no failure to precede decoding can be realized with a simple construction.

Further, in this picture signal decoding apparatus, the above effects can be obtained without using a circuit having remarkably higher processing speed, therefore, it can reduce the consumption electric power and cut the cost in comparison with the case where a high-speed circuit is combined with a conventional picture signal decoding apparatus.

In the aforementioned embodiment, the data structure of the bit stream S1 is formed in three hierarchies of macro block, slice and frame. However, this invention is not limited to this, but the similar processing can be applied to the bit stream S1 having a structure in more great number of hierarchies.

Further, in the aforementioned embodiments, decoding is restarted from the head of a slice by skipping the bit stream S1 in a slice unit. However, this invention is not limited to this, but may restart decoding in a macro block unit which is a lower hierarchy than a slice.

Further, in the aforementioned embodiments, the IDCT processing is performed after inversely quantized, however, in the case where an orthogonal transform coding system other than the DCT is utilized in coding, it should be performed an inverse-transform processing corresponding to that.

Furthermore, in the aforementioned embodiments, it has been described mainly about decoding of a picture signal. However, the present invention is not limited to this, but may be applied to decoding of a voice signal, a control signal or the like, that is simultaneously transmitted with a picture signal.

As described the above, according to this invention, when it is specified that an arbitrary magnifying and displaying mode in which a part of a decoded picture is magnified to an arbitrary size and displayed on a display screen, decoding of an input picture signal corresponding to a bidirectional predictive picture out of input picture signal is started from a signal portion corresponding to the input displaying start position. Thus a picture signal decoding apparatus in which displaying does not precede decoding can be accomplished with a simple construction.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A picture signal decoding method for decoding transmitted coded data to generate a decoded picture, comprising the steps of:

receiving said coded data including a coded picture signal and predetermined control data, and separating said received coded data into said coded picture signal and said predetermined control data;

decoding a frame picture signal which is included in said coded picture signal and used as a predictive picture on decoding, to generate a first decoded picture, said first decoded picture being written into a first frame memory;

applying a predetermined processing to any one part of said first decoded picture to generate a special picture, and generating a special display command signal for display of the special picture on a display screen; and if said special display command signal is generated, determining the header address of said any one part of said first decoded picture in said first frame memory processed into said special picture as a display start position, and starting to decode a bidirectional predictive frame picture at a signal portion corresponding to the display start position of the special picture to generate a second decoded picture, said second decoded picture being written into a second frame memory.

2. The picture signal decoding method according to claim 1, wherein said special display command signal is a signal which commands extracting of said any one part of said decoded picture, magnifying to an arbitrary size, and display on said display screen.

3. The picture signal decoding method according to claim 1, wherein said predetermined control data includes picture structure information containing a frame structure mode in which a picture signal is coded in a unit of frame in which a first field and a second field are mixed, and a field structure mode in which the second field is coded after coding of the first field is completed.

4. The picture signal decoding method according to claim 3, wherein, the signal portion corresponding to said display position is retrieved on the basis of said picture structure information of a picture signal to be decoded.

5. The picture signal decoding method according to claim 1, wherein said predetermined control data includes slice address information which shows that a picture block to be decoded is corresponding to which position in the vertical direction of one screen.

6. The picture signal decoding method according to claim 5, wherein, the signal portion corresponding to said display position is retrieved on the basis of slice address information of a picture block to be decoded.

7. The picture signal decoding method according to claim 6, wherein, if the signal portion corresponding to said display position is not corresponding to the head of a macro-block, the decoding operation is controlled so that the decoding start position is shifted so as to correspond to the head of a macro-block.

8. A picture signal decoding apparatus for decoding transmitted coded data to generate a decoded picture, comprising:

separating means for receiving said coded data including coded picture signal and predetermined control data, and separating said received coded data into said coded picture signal and said predetermined control data;

first writing means for decoding a frame picture signal which is included in said coded picture signal and used as a predictive picture on decoding, to generate a first decoded picture, said first decoded picture being written into a first frame memory;

command signal generating means for applying a predetermined processing to a any one part of said first decoded picture to generate a special picture, and generating a special display command signal for display of the special picture on a display screen; and second writing means, responsive to said special display command signal, for determining the header address of said any one part of said first decoded picture in said first frame memory processed into said special picture as a display start position, and starting to decode a bidirectional predictive frame picture at a signal portion corresponding to the display start position of the special picture to generate a second decoded picture, said second decoded picture being written into a second frame memory means.

9. The picture signal decoding apparatus according to claim 8, wherein said special display command signal is a signal which commands extracting of said any one part of said decoded picture, magnifying to an arbitrary size thereof, and display on said display screen thereof.

10. The picture signal decoding apparatus according to claim 8, wherein said predetermined control data includes picture structure information containing a frame structure mode in which a picture signal is coded in a unit of frame in which a first field and a second field are mixed, and a field structure mode in which the second field is coded after coding of the first field is completed.

11. The picture signal decoding apparatus according to claim 10, wherein said second writing means retrieves the signal portion corresponding to said display position on the basis of said picture structure information of a picture signal to be decoded.

12. The picture signal decoding apparatus according to claim 8, wherein said predetermined control data includes slice address information which shows that a picture block to be decoded is corresponding to which position in the vertical direction of one screen.

13. The picture signal decoding apparatus according to claim 12, wherein said second writing means retrieves the signal portion corresponding to said display position on the basis of slice address information of a picture block to be decoded.

14. The picture signal decoding apparatus according to claim 13, wherein if the signal portion corresponding to said display position is not corresponding to the head of a macro-block, said second writing means controls so that the decoding start position is shifted so as to correspond to the head of a macro-block.

15. A picture signal decoder for MPEG decoding pictures transmitted as coded data to generate decoded pictures, wherein said decoder employs first, second and third frame memories with said third frame memory used for storing and displaying in common a bidirectional predictive frame picture, comprising:

decoding means for decoding said pictures, said decoding means being operative during a first unit of time to decode and store a frame picture in said first frame memory, and being operative during a second unit of time to decode and store said bidirectional predictive frame picture in said third frame memory on the basis of the decoded frame picture;

special picture processing means for reading, during said second unit of time and in response to a special display command signal, any one part of said bidirectional predictive frame picture decoded by said decoding means and for processing said any one part of said bidirectional predictive frame picture decoded by said decoding means into a special picture for display; and decoding-start position determining means for determining, during said second unit of time and in response to said special display command signal, the start position in said third frame memory where said decoding means begins decoding said bidirectional predictive frame picture corresponding to a beginning of said any one part to be processed into said special picture by said special picture processing means.

16. The picture signal decoder of claim 15, wherein said decoding-start position determining means determines said start position on the basis of a frame structure of said bidirectional predictive frame picture, wherein said frame structure includes a frame having a first field and a second field alternated line-by-line and a frame having the first and second fields separated.

17. The picture signal decoder of claim 16, wherein said decoding-start position determining means determines said start position on the basis of the number of lines in said frame structure.

* * * * *